United States Patent

Nakayama

[11] Patent Number: 5,124,790
[45] Date of Patent: Jun. 23, 1992

[54] SIGNAL PROCESSING DEVICE

[75] Inventor: Tadayoshi Nakayama, Tokyo, Japan

[73] Assignee: Canon Kabushiki Kaisha, Tokyo, Japan

[21] Appl. No.: 482,230

[22] Filed: Feb. 20, 1990

[30] Foreign Application Priority Data

Feb. 28, 1989 [JP] Japan ............................. 1-048910

[51] Int. Cl.⁵ .................... H04N 7/12; H04N 5/14
[52] U.S. Cl. .......................... 358/133; 358/135; 358/160; 358/426; 358/261.2
[58] Field of Search ............... 358/133, 135, 136, 137, 358/138, 12, 22, 160, 426, 261.2; 375/27, 28

[56] References Cited

U.S. PATENT DOCUMENTS

| | | | |
|---|---|---|---|
| 4,316,222 | 2/1982 | Sabramanian | 358/261.4 |
| 4,371,895 | 2/1983 | Koga | 358/138 |
| 4,468,708 | 8/1984 | Coleman, Jr. | 358/135 |
| 4,782,387 | 11/1988 | Sabri et al. | 358/138 |
| 4,831,439 | 5/1989 | Fedele et al. | 358/136 |
| 4,875,090 | 10/1989 | Shimokoriyamat et al. | 358/12 |
| 4,901,148 | 2/1990 | Nakayama et al. | 358/138 |
| 4,924,298 | 5/1990 | Kitamura | 358/133 |
| 4,942,476 | 7/1990 | Koga et al. | 358/136 |
| 4,992,889 | 2/1991 | Yamagami et al. | 358/426 |
| 4,999,715 | 3/1991 | Porcellio et al. | 358/426 |

*Primary Examiner*—James J. Groody
*Assistant Examiner*—Michael H. Lee
*Attorney, Agent, or Firm*—Robin, Blecker, Daley & Driscoll

[57] ABSTRACT

A signal processing device in which compressed encoded information obtained by encoding an input information signal based on use of correlation between components thereof is written in a memory capable of simultaneously performing write and read operations, and the encoded information read out from the memory is decoded to restore the information signal while signal processing is effected by using the information signal prior to the encoding and the decoded information signal.

15 Claims, 7 Drawing Sheets

SIGNAL PROCESSING DEVICE

BACKGROUND OF THE INVENTION

1. Field of the Invention

This invention relates generally to data processing devices and, more particularly, to a data processing device for effecting digital information processing by using a large-capacity memory.

2. Description of the Related Art

Recently, the bit unit cost of memories is greatly reduced, and apparatus which are manufactured at comparatively low costs for home or personal use but which have large-capacity memories such as field or frame memories for video signal processing are therefore increasing.

Figure 1:
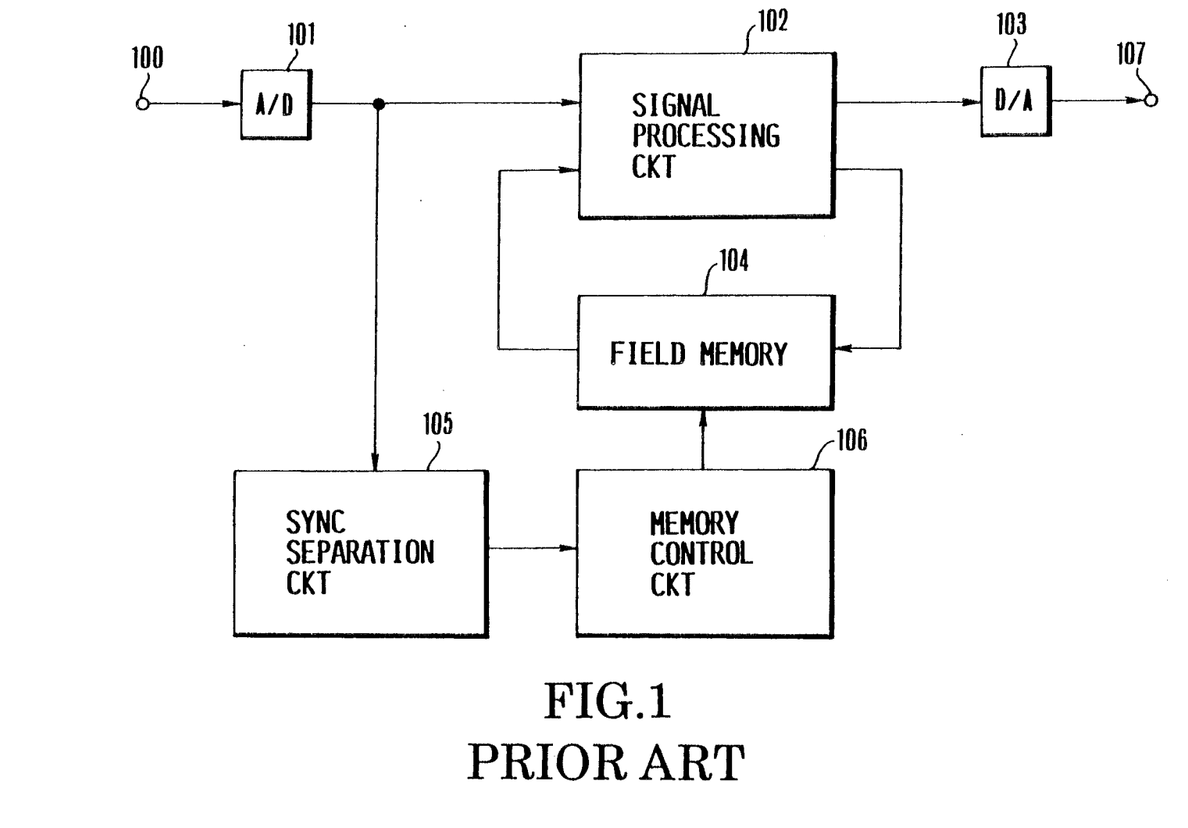
FIG. 1 is a schematic diagram of the construction of a conventional video signal processing circuit using a large-capacity memory.

FIG. 1 schematically shows the arrangement of a conventional video signal processing circuit having such a large-capacity memory. This arrangement includes an analog video signal input terminal 100, an A/D converter 101 for digitizing an input analog video signal, a signal processing circuit 102 for processing the digitized video signal, a D/A converter 103 for converting the digital video signal processed by the signal processing circuit 102 into an analog signal, a field memory 104 for effecting digital signal exchange with the signal processing circuit 102, a sync separation circuit 105 for separating a sync signal from the digital video signal supplied from the A/D converter 101, and a memory control circuit 106 for controlling the timing of write and read operations of the field memory 104 by the timing in accordance with the sync signal separated by the sync separation circuit 105.

In the arrangement shown in FIG. 1, various kinds of processing can be performed by selecting the construction of the signal processing circuit 102 and write/read patterns for the field memory 104. In a VTR system, for example, special reproduction such as still reproduction or slow reproduction can be performed based on intermittently writing and continuously reading. Also, noise reduction processing of a field cycle type or composition processing using the image corresponding to the output from the A/D converter 101 and the image corresponding to the output from the field memory 104 can be performed based on continuously performing both write and read. The composition processing is, for example, wipe or fade processing.

Examples of systems for effecting these kinds of processing are known; an example of the above special reproduction is disclosed in Japanese Patent Application No. Sho 61-217030, an example of noise reduction processing is disclosed in Japanese Patent Application No. Sho 63-16895, and an example of composition processing is disclosed in Japanese Patent Application No. Sho 63-273356 (already filed for USP). Details of these systems will not be described in this specification because the internal arrangement of the signal processing circuit 102 does not directly relate to the present invention.

In the above-described arrangement, a capacity of 8 (bits)×256 k (samples)=2M (bits) is needed for storing television signals such as NTSC signals or PAL signals in the field memory 104 without substantial deterioration of the signal. Although the development of large-capacity memories promoted recently has reduced the unit cost, the price of memories having a capacity of 2 Mbits is high and it is rather difficult to use such a memory for home or personal apparatus.

SUMMARY OF THE INVENTION

In view of these circumstances, an object of the present invention is to provide a data storage device which enables application of signal processing without using a large-capacity memory to home or personal appliances.

Another object of the present invention to provide a small and low-cost signal processing device having a memory capacity for one picture.

To achieve these objects, the present invention provides a data processing device comprising: encoding means for encoding an information signal by utilizing correlation between components thereof to output encoded information having a compressed information content; a memory capable of being used for write and read of the encoded information, the memory being capable of simultaneously effecting both read and write operations; decoding means for decoding the encoded information read out from the memory to restore the information signal; and signal processing means for effecting signal processing using the information signal input into the encoding means and the information signal output from the decoding means.

Other objects and features of the present invention will become more clear upon reading the following description of embodiments of the present invention taken in conjunction with the accompanying drawings.

DETAILED DESCRIPTION OF THE PREFERRED EMBODIMENTS

The present invention will be described below with respect to embodiments thereof.

In accordance with the present invention, the amount of data to be stored in the field memory may be reduced by effecting data compression using correlation of the data to enable a reduction in the necessary capacity of the field memory.

For example, if the amount of data is compressed into one-half, the capacity of the field memory can be limited to 1 Mbits. In this case, however, it is necessary to provide high-efficiency encoder and decoder circuits at the front and rear of the field memory.

Figure 2:
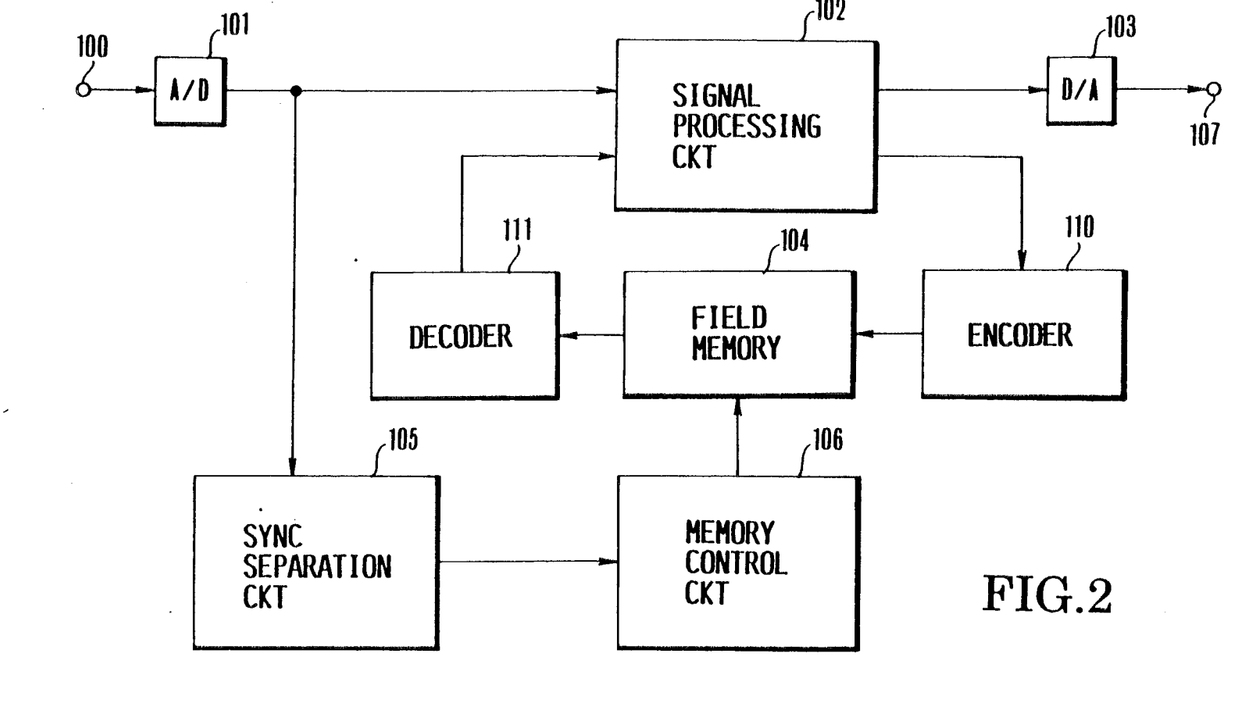
FIG. 2 is a schematic diagram of the construction of an example of a video signal processing circuit in accordance with the present invention.

FIG. 2 schematically shows the construction of an example of a video signal processing circuit in accordance with the present invention in which the amount of data is reduced by such high-efficiency encoding and efficient-encoding codes are thereafter stored in the memory. In FIG. 2, components identical or corresponding to those shown in FIG. 1 are indicated by the same reference numerals and the description thereof will not be repeated. In FIG. 2, reference numerals 110 and 111 denote a high-efficiency encoder and a high-efficiency decoder, respectively, which are provided at the front and rear of the field memory 104 as shown in the figure and which can be operated simultaneously.

In a case where the amount of data is reduced based on high-efficiency encoding to reduce the capacity of the memory, the efficacy of reducing the memory capacity is lost if devices or circuits having excessively complicated constructions are used as the encoder 110 and the decoder 11.

For this reason, a coding method using a simple arrangement, e.g., differential predictive coding method (DPCM) is suitable for high-efficiency encoding using the arrangement shown in FIG. 2.

DPCM is a data compression method based on utilization of a high degree of correlation between adjacent sampled values obtained by sampling a video or audio signal. The encoding operation of this method resides in a process in which a decoded value corresponding to a sampled value already transmitted is used to obtain a prediction value for a sampled value which is to be encoded next, and the value of the difference between the prediction value and the sampled value (prediction error) is quantized. The quantization characteristic may be made non-linear to limit the deterioration of the data to a minimum level even if the number of bits of the difference value is set to about ½ of the number of bits of the input sampled value.

Figure 3:
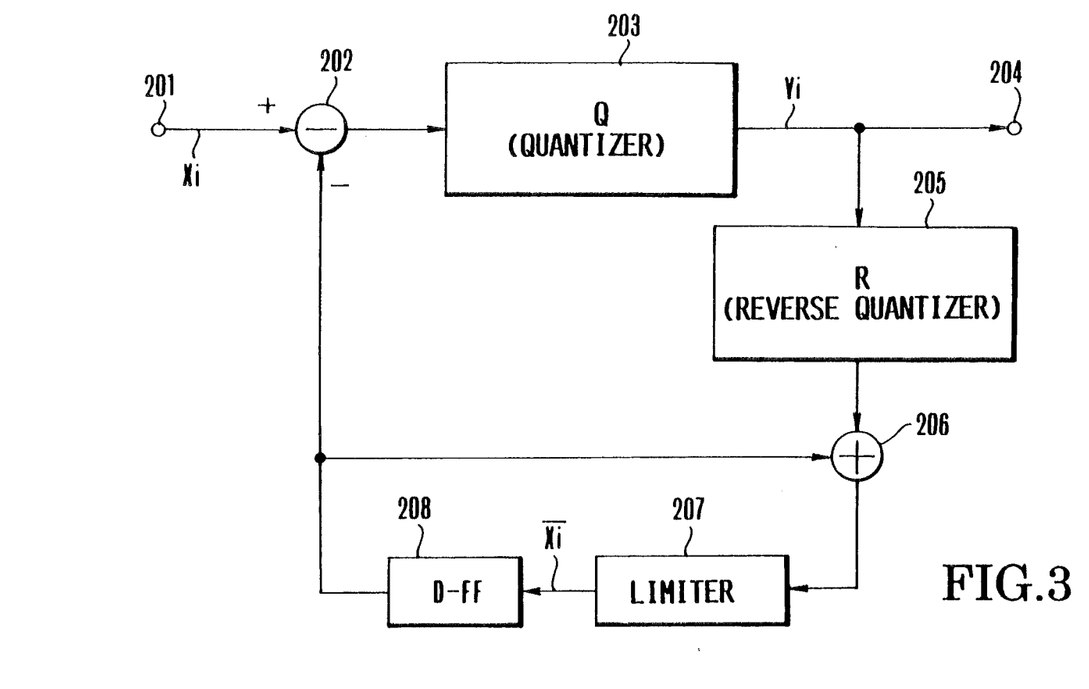
FIG. 3 is a diagram of the construction of an encoding unit of a preceding value prediction encoding type.

Various types of DPCM using different systems of producing the prediction value have been proposed. FIG. 3 shows the construction of an encoding unit having preceding value prediction encoding system which is the simplest among them. In the preceding value prediction encoding system, the decoded value corresponding to the sampled value one time previously is used as the prediction value.

Referring to FIG. 3, a sampled value Xi input through a terminal 201 is applied to a subtracter 202, and a prediction value (decoded value of the preceding value) described later is subtracted therefrom. A quantizer 203 quantizes the difference value which is the output from the subtracter 202 and outputs an encoded code Yi through an output terminal 204. The encoded code Yi is also applied to a reverse quantizer 205. The reverse quantizer 205 converts the encoded code Yi into a difference value (quantized representative) and applies the same to an adder 206. The adder 206 adds the prediction value to this difference value to restore the input sampled value. Because the restored input sampled value contains a quantization error, it may be a value which is impossible in reality. Then, the amplitude of the output from the adder 206 is limited within the range of the original input sampled value by a limiter 207 and is applied as a locally decoded value to a D-flip-flop 208 serving as a predictor. Since in this example the preceding-value-decoded value is used as the prediction value, a D-flip-flop for simply effecting delay of data is used as the predictor. The D-flip-flop 208 applies the locally decoded value as the prediction value to the subtracter 202 and the adder 206 in the next clock cycle.

Figure 4:
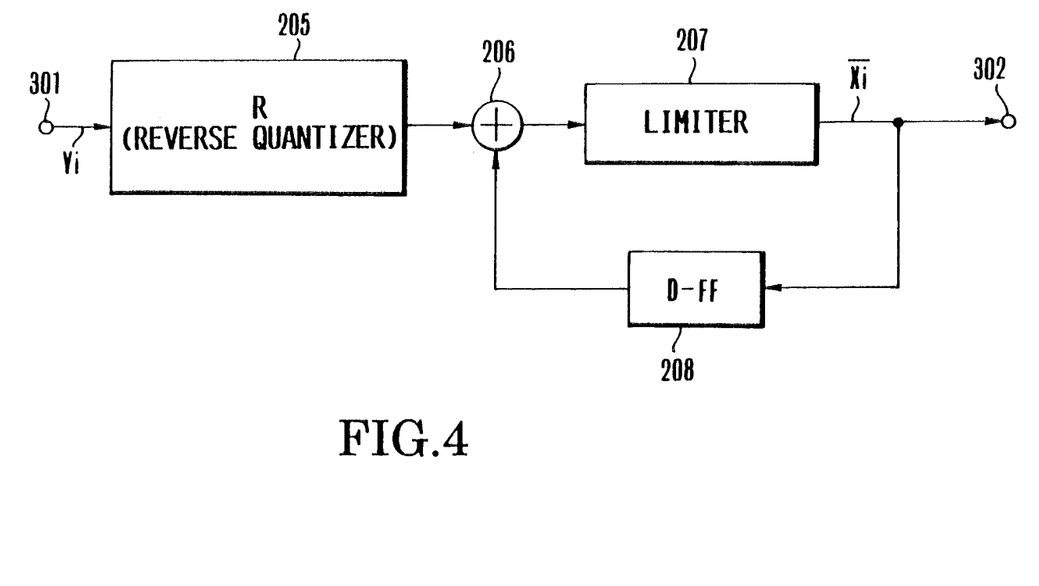
FIG. 4 is a diagram of the construction of a decoding unit mating with the encoding unit shown in FIG. 3.

FIGS. 4 shows the construction of an example of a decoding unit mating with the encoding unit shown in FIG. 3.

Referring to FIG. 4, the encoded code Yi obtained by the encoding unit is input through an input terminal 301 and is applied to a reverse quantizer 205. Each of this reverse quantizer 205, an adder 206, a limiter 207 and D-flip-flop 208 of this unit has the same function as the block of the encoding unit of FIG. 5 indicated by the corresponding reference numeral. The output from the limiter 207 of this decoding unit is output through an output terminal 302 as a decoded value.

In the DPCM encoding system, the locally decoded value and the prediction value obtained in the encoding unit respectively coincide with the decoded value and the prediction value obtained in the decoding unit which correspond time-wise to the former. The reason for saying that these values correspond time-wise to each other is that the decoded value and the prediction value obtained in the decoding unit are delayed relative to the locally decoded value and the prediction value obtained in the encoding unit.

If error occurs in the encoded code by the influence of noise of the like during transmission of this code, the decoded value and the prediction value obtained in the decoding unit deviate from the normal values and become different from the time-wise corresponding locally decoded value and prediction value in the encoding unit, thereby producing difference components. Even if no transmission error further occurs, the difference components are maintained (propagated) as errors.

To cope with such transmission errors, the operations of the encoding unit and the decoding unit are periodically initialized to prevent, for the subsequent data, propagation of the difference components (errors) produced with code errors. For example, a method of transmitting data without prediction encoding or a method of setting the time-wise corresponding predictors used in the encoding and decoding devices to certain set values has been proposed.

Figure 5:
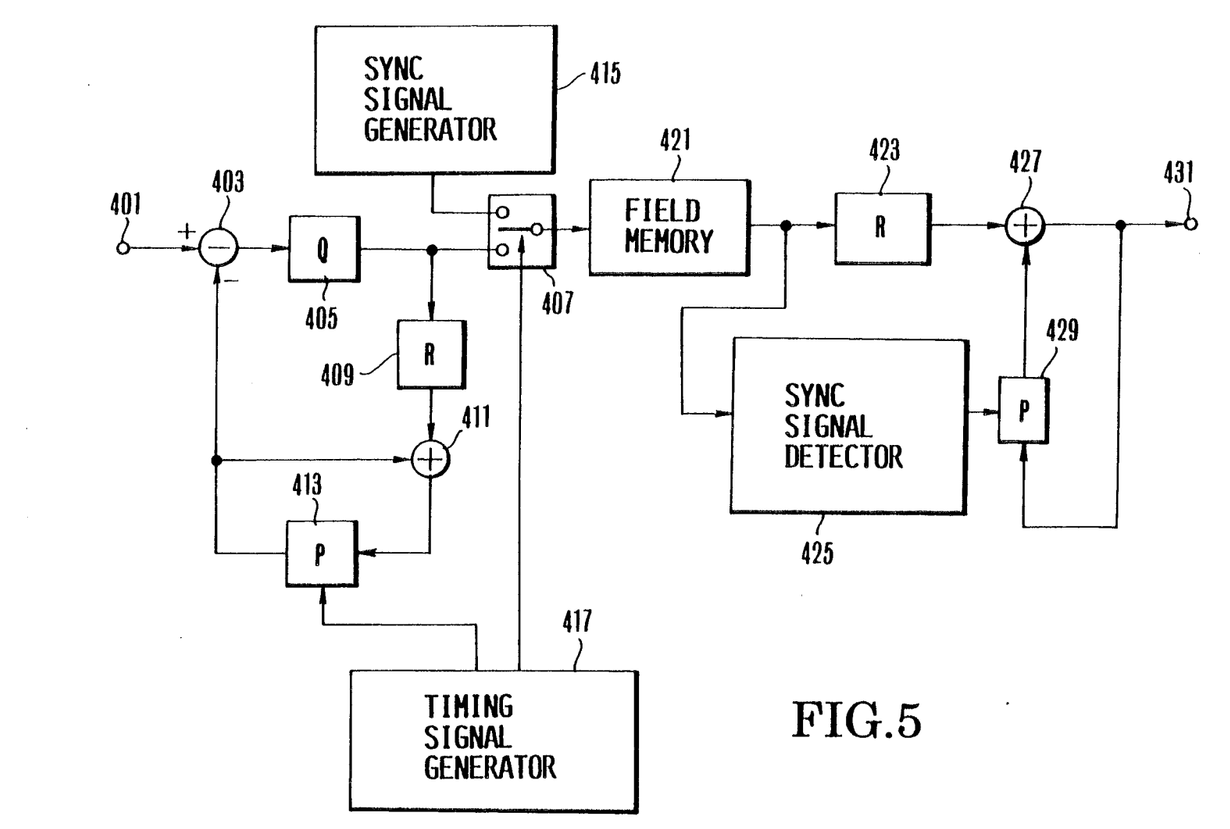
FIG. 5 is a diagram of the construction of another example of the video signal processing circuit in accordance with a present invention.

FIG. 5 shows the construction of an example of a processing circuit in accordance with the present invention in which an encoding unit and a decoding unit which perform operations for this initialization are provided at the front and the rear of the field memory.

Referring to FIG. 5, this processing circuit has a digital data input terminal 401, a subtracter 403, a quantizer 405, reverse quantizers 409 and 423, predictors 413 and 249 constituted by limiters and D-flip-flops as described above in the case of preceding value prediction, adders 411 and 427, and another subtracter 403. These components function in the same manner as the corresponding components of the encoding and decoding units described with reference to FIGS. 3 and 4.

The circuit shown in FIG. 5 also has a field memory 421, a sync signal generator 415, a data selector 407, a timing signal generator 417 for initializing the operation of the predictor 413 and for controlling the selector 407, and a sync signal detector 425.

Ordinarily, the selector 407 selects an encoded code output from the quantizer 405 and transmits the selected code to the field memory 421. Prior to the initialization of the operation of the predictor 413 in the encoding unit, the selector 407 selects the signal output from the sync signal generator 415 based on the control signal supplied from the timing signal generator 417, and transmits the selected signal to the field memory 421. After the transmission of this sync signal has been effected for a predetermined period of time, a reset signal is applied from the timing signal generator 417 to the predictor 413. In response to this signal, the predictor 413 sets the prediction value to a certain set value to effect the operation initialization. At this time, the subtracter 403 outputs the value of the difference (prediction error) between input data (hereinafter referred as "top data") from the terminal 401 and the set value, and the quantizer 405 outputs an encoded code (hereinafter referred to as "top code") obtained by quantizing this difference value. The selector 407 is then changed over by the control signal from the timing signal generator 417 to transmit this top code to the field memory 421 subsequently to the sync signal. Thereafter, encoded codes are successively transmitted.

On the other hand, on the side of the decoding unit, the above-mentioned sync signal is detected with the sync signal detector 425 from the signal output from the field memory 421. In synchronism with the detection of the sync signal, the operation of the predictor 429 is initialized by a predetermined timing. That is, the prediction value is set to the above-mentioned set value. This predetermined timing corresponds to the timing by which the top code is input into the reverse quantizer 423. The output from the reverse quantizer 423 obtained at this time has a value obtained by reversely quantizing the value quantized from the value of difference between the top data and the set value. Accordingly, the top data is decoded by adding the set value to this output value with the adder 427. Once the top data is decoded, the subsequent data can be decoded.

In the arrangement shown in FIG. 5, the sync signal generator 415 and the data selector 407 are required for circuit initialization on the side of the encoding unit, and the sync signal detector 425 is especially required for initialization of the predictor on the side of the decoding unit. This arrangement is ineffective in terms of circuit design.

Also, there is a possibility of failure to correctly performing the above initializing operation owing to errors in the sync signal input to or output from the field memory.

Figure 6:
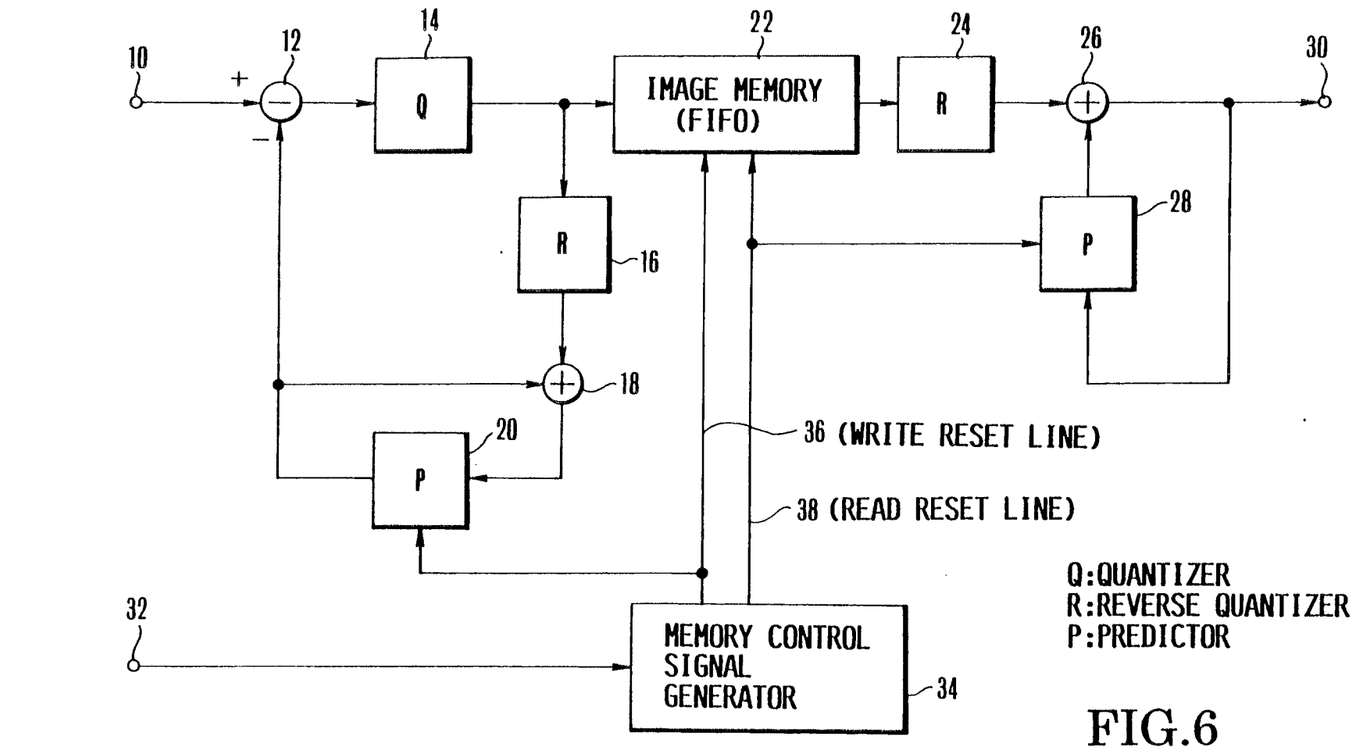
FIG. 6 is a block diagram of the construction of an example of a data processing device in accordance with the present invention.

FIG. 6 is a block diagram of the construction of an example of a signal processing device in accordance with the present invention. This signal processing device has a digital video data input terminal 10, a subtracter 12, a quantizer 14, reverse quantizers 16 and 24, adders 18 and 26, predictors 20 and 28, a digital video data output terminal 30, an line 32 for receiving horizontal and vertical sync signals in the input video signal, a memory control signal generator 34, a field memory 22 constituted by a first-in/first-out type image memory (hereinafter referred to simply as "FIFO").

Ordinarily, the FIFO is controlled by only six types of control signals alone, which are write clock, read clock, write enable signal, read enable signal, write reset signal, and read reset signal. Of these signals, only the write reset signal and the read reset signal directly relate to the present invention, and the other signals are therefore not shown.

If the write reset signal is applied to the FIFO 22, data thereafter input into the FIFO 22 is written from the top address in the memory. If the read reset signal is applied to the FIFO 22, data thereafter output is successively read out from the top address of the memory to be output. The write reset signal and the read reset signal are produced by the memory control signal generator 34 one time for each one field in a timing in accordance with the horizontal and vertical sync signals input through the terminal 32.

In this embodiment, when the write reset signal is applied to the FIFO 22 via a write reset line 36, it is simultaneously applied to the predictor 20, and the output from the predictor 20 is set to the above-mentioned set value. Consequently, the encoded code output from this DPCM encoder (from the quantizer 14) becomes the code (top code) obtained by quantizing the value of the difference between this set value and the input data (top data) and is written in the top address of the FIFO 22.

Similarly, when the read reset signal is applied to the FIFO 22 via a read reset line 38, it is simultaneously applied to the predictor 28, and the output from the predictor 28 is set to the above-mentioned present value. Accordingly, the output from the FIFO 22 is the above-mentioned top code. This code is reversely quantized by the reverse quantizer 24 to restore the difference value, and the restored difference value and the set value output from the predictor 28 are added to each other by the adder 26, thereby restoring the above-mentioned top data. Once this top data is restored, the whole of subsequent data can be decoded by the ordinary processing of the encoded codes thereafter output from the FIFO 22.

Figure 7:
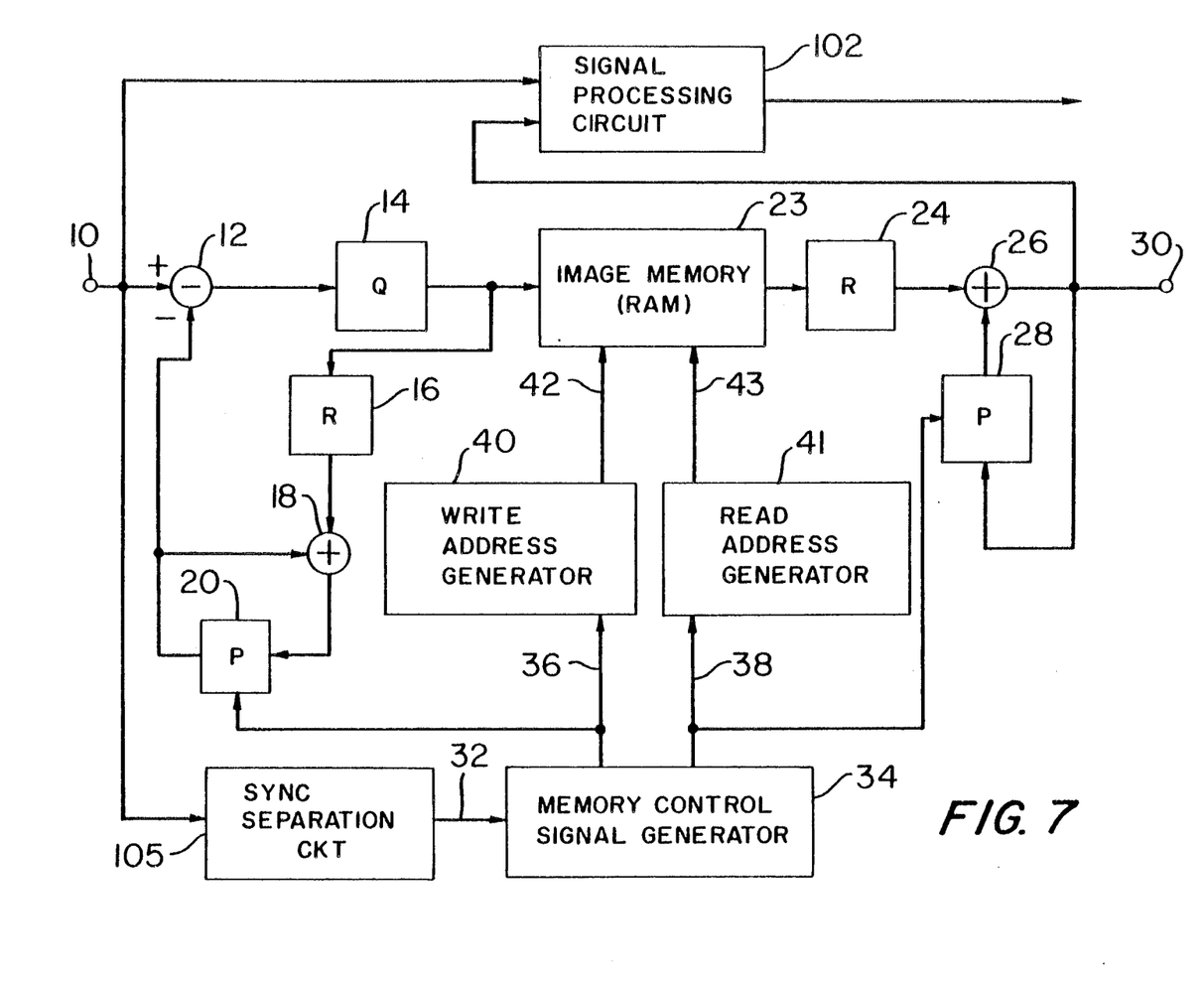
FIG. 7 is a block diagram of the construction of another example of the data processing device in accordance with the present invention.

FIG. 7 shows the construction of another example of the signal processing device in accordance with the present invention. In FIG. 7, components identical or corresponding to those shown in FIG. 6 are indicated by the same reference numerals and the description thereof them will not be repeated.

The difference between the embodiment shown in FIG. 7 and the embodiment shown in FIG. 6 resides in that an image memory 23 of the former is not an FIFO but a random access type image memory (hereinafter referred to simply as "RAM").

Correspondingly, address information for controlling write/read addressing of the RAM 23 is required, and a write address generator 40 for designating the write address and a read address generator 41 for designating the read address are provided. Each address data is applied to the RAM 23 via a line 42 or 43.

The write address generator 40 resets the output write address data to the data corresponding to the initial address by the write reset signal supplied from the memory control signal generator 34 as also described with respect to the embodiment shown in FIG. 6. Similarly, the read address generator 41 resets the output read address data to the data corresponding to the initial address by the read reset signal supplied from the memory control signal generator 34. As in the case of the embodiment shown in FIG. 6, the output from the predictor 20 is set to the above-mentioned set value by the application of the write reset signal, and the output from the predictor 28 is set to the above-mentioned set value by the application of the read reset signal. The operations of the other components are the same as the embodiment shown in FIG. 6.

Consequently, the encoded code (top code) produced by the quantizer 14 immediately after the resetting of the predictor 20 is stored in the initial address of the RAM 23, and this top code is read out from the RAM 23 simultaneously with the resetting of the predictor 28 of the decoding unit.

Thus, in the embodiment shown in FIG. 7, the top data can be decoded with reliability as in the case of the embodiment shown in FIG. 6, and sampled values corresponding to subsequent encoded codes can be decoded without failure.

In the data storing devices in accordance with above described embodiments, the initialization of the write operation of the memory and the initialization of the operation of the DPCM encoding unit are synchronized, thereby enabling the decoding operation of the decoding unit to be initialized by the timing corresponding to that of the initialization of the encoding unit. Thus, the operation of the decoding unit can be initialized with improved reliability by the circuit arrangement is simplified.

In the above-described embodiments, preceding-value-difference encoding is conducted as prediction coding. However, an arrangement such as that shown in FIG. 6 or 7 is very effective so long as it is used for a prediction coding circuit having a comparatively simple circuit arrangement and requiring initialization of the decoding operation on the decoding side.

The field memories are used as the memories of the above-described embodiment and the prediction encoding unit and the decoding unit are provided at the front and rear of the memory. However, in a case where components such as a delay circuit and a data selector are provided between the memory and the encoding and decoding units for convenience of processing, the present invention can be applied in the same manner while considering the time delay owing to this circuit arrangement. For example, in a case where a one-horizontal-scanning-term delay line exists between the quantizer 14 and the FIFO 22 of the device shown in FIG. 6, the timing of initialization of the predictor 20 may be set so as to be faster than the timing of resetting of the FIFO 22 by one horizontal scanning term.

As described above with respect to the signal processing devices shown in FIGS. 6 and 7, initialization on the decoding side can be performed with improved reliability by using a simple circuit arrangement even if memory write errors occur.

What is claimed is:

1. A data processing device, comprising:
   (a) a predictive differential encoding circuit for effecting predictive differential encoding of a video signal by utilizing correlation between components thereof to output an encoded video information having a compressed video information content;
   (b) a memory capable of being used for write and read of the encoded information, said memory being capable of simultaneously effecting both read and write operations;
   (c) a predictive differential decoding circuit for decoding the encoded video information read out from said memory to output a restored video signal;
   (d) a separation circuit for separating a synchronizing signal from the video signal input into said encoding circuit;
   (e) timing control means for controlling the timing of resetting a write address of said memory and the timing of resetting a read address of said memory, by using the synchronizing signal separated by said separation circuit, said timing control means being further arranged to reset a predicting operation of said encoding circuit by the timing corresponding to the write address reset timing and a predicting operation of said decoding circuit by the timing corresponding to the read address reset timing; and
   (f) signal processing means for effecting signal processing using the video signal input into said encoding circuit and the restored video signal output from said decoding circuit.

2. A data processing device comprising:
   (a) encoding means for effecting predictive differential encoding of an information signal by utilizing correlation between components thereof to output encoded information having a compressed information content;
   (b) a memory capable of being used for write and read of the encoded information;
   (c) decoding means for decoding the encoded information read out from said memory to restore the information signal; and
   (d) timing control means for controlling first timing for resetting a predicting operation of said encoding means, second timing for resetting a write address of said memory, third timing for resetting a predicting operation of said decoding means and fourth timing for resetting a read address of said memory, the first timing and the second timing being synchronized with each other, the third timing and the fourth timing being synchronized with each other.

3. A device according to claim 1, wherein said timing control means is arranged to equalize the number of times of resetting of the predicting operation of said encoding means and the number of times of resetting the write address of said memory and to equalize the number of times of resetting of the predicting operation of said decoding means and the number of times of resetting the read address of said memory.

4. A device according to claim 1, wherein said memory is a first-in/first-out memory, the second timing is timing for resetting the write address of said first-in/first-out memory, and the fourth timing is timing for resetting the read address of said first-in/first-out memory.

5. A device according to claim 2, wherein said memory is a random-access memory, the second timing is timing for resetting the write address of said random-access memory, and the fourth timing is timing for resetting the read address of said random-access memory.

6. A device according to claim 2, further comprising signal processing means for effecting signal processing using the information signal input into said encoding means and the information signal output from said decoding means.

7. A data processing device comprising:
   (a) encoding means for effecting predictive differential encoding of an information signal by utilizing correlation between components thereof to output encoded information having a compressed information content;
   (b) a memory in which the encoded information can be written; and
   (c) timing control means for synchronizing first timing for resetting a predicting operation of said encoding means and second timing for resetting the write address of said memory.

8. A device according to claim 6, wherein said timing control means is arranged to equalize the number of times of resetting of the predicting operation of said encoding means and the number of times of resetting the write address of said memory.

9. A device according to claim 8, wherein said memory is a first-in/first-out memory, and the second timing is timing for resetting the write address of said first-in/first-out memory.

10. A device according to claim 8, wherein said memory is a random-access memory, and the second timing is timing for resetting the write address of said random-access memory.

11. A device according to claim 8, further comprising decoding means for effecting predictive differential decoding of the encoded information read out from said memory to restore the information signal, wherein said timing control means synchronizing third timing for resetting a predicting operation of said decoding means and fourth timing for resetting the read address of said memory.

12. A device according to claim 11, wherein said timing control means is arranged to equalize the number of times of resetting of the predicting operation of said decoding means and the number of times of resetting the read address of said memory.

13. A data processing device comprising:
(a) a memory in which encoded information of a compressed information content obtained by effecting predictive differential encoding of an information signal based on use of correlation between components thereof can be stored, and from which the encoded information can be read out;
(b) decoding means for effecting predictive differential decoding of the encoded information read out from said memory to restore the information signal;
(c) timing control means for synchronizing first timing for resetting a predicting operation of said decoding means and second timing for resetting a read address of said memory.

14. A data processing device comprising:
(a) encoding means for effective predictive differential encoding of an information signal by utilizing correlation between components thereof to output encoded information having a compressed information content;
(b) a memory in which the encoded information can be written; and
(c) reset means for resetting a predicting operation of said encoding means and for resetting a write address of said memory, said resetting means being arranged to equalize the number of times of resetting of the predicting operation and the number of times of resetting of the write address of said memory.

15. A data processing device comprising:
(a) a memory in which encoded information of a compressed information content obtained by effecting predictive differential encoding of an information signal based on use of correlation between components thereof can be stored, and from which the encoded information can be read out;
(b) decoding means for effecting predictive differential decoding of the encoded information read out from said memory to restore the information signal;
(c) reset means for resetting a predicting operation of said encoding means and for resetting a read address of said memory, said resetting means being arranged to equalize the number of times of resetting of the predicting operation and the number of times of resetting of the read address of said memory.

* * * * *

UNITED STATES PATENT AND TRADEMARK OFFICE
CERTIFICATE OF CORRECTION

PATENT NO. : 5,124,790
DATED      : June 23, 1992
INVENTOR(S) : Tadayoshi Nakayama It is certified that error appears in the above-identified patent and that said Letters Patent is hereby corrected as shown below:

```
Col. 1, line 12.   Change "is" to -- has been --
Col. 2, line 9.    After "invention" insert -- is --
Col. 2, line 43.   Change "the" to -- a --
Col. 3, line 39.   After "having" insert -- a --
Col. 4, line 24.   Change "of" to -- or --
Col. 5, line 40.   Change "performing" to -- perform --
Col. 5, line 49.   Change "an" to -- a --
Col. 5, line 55.   Delete "alone"
Col. 6, line 32.   Delete "them"
Col. 6, line 35.   Change "an" to -- a --
Col. 8, lines 26 and 34.   Change "claim 1" to -- claim 2 --
Col. 8, line 62.   Change "claim 6" to -- claim 7 --
```

Signed and Sealed this

Sixteenth Day of November, 1993

Attest:

BRUCE LEHMAN

*Attesting Officer*     Commissioner of Patents and Trademarks